United States Patent [19]

Kleist

[11] 4,058,385

[45] Nov. 15, 1977

[54] METHOD FOR TRANSPORTING GLASS FIBERS

[75] Inventor: Dale Kleist, St. Louisville, Ohio

[73] Assignee: Owens-Corning Fiberglas Corporation, Toledo, Ohio

[21] Appl. No.: 618,588

[22] Filed: Oct. 1, 1975

Related U.S. Application Data

[63] Continuation of Ser. No. 477,722, June 10, 1974, abandoned, which is a continuation of Ser. No. 316,141, Dec. 18, 1972, abandoned.

[51] Int. Cl.² .............................................. C03B 37/02
[52] U.S. Cl. .................................... 65/2; 65/9; 65/11 W; 65/12; 264/176 F; 264/210 F
[58] Field of Search .................. 65/2, 11 W, 9, 12; 264/176 F, 210 F

[56] References Cited

U.S. PATENT DOCUMENTS

| 3,304,163 | 2/1967 | Holsehlag | 65/2 X |
| 3,558,293 | 1/1971 | Zurheide | 65/12 X |
| 3,697,241 | 10/1972 | Strickland et al. | 65/2 |
| 3,773,483 | 11/1973 | Schmidt | 65/2 |
| 3,787,195 | 1/1974 | Kircheim | 65/9 |

Primary Examiner—Robert L. Lindsay, Jr.
Attorney, Agent, or Firm—Ronald C. Hudgens; Charles R. Schaub

[57] ABSTRACT

A method and apparatus for reducing tension due to air drag in continuous filaments moved at high linear speeds by establishing a contoured air passage surrounding the filaments and moving air in the direction of the movement of the filaments at a velocity substantially equal to the velocity of the moving filaments. The method and apparatus are described in relation to a glass fiber process wherein the filaments are attenuated at high linear speeds.

9 Claims, 6 Drawing Figures

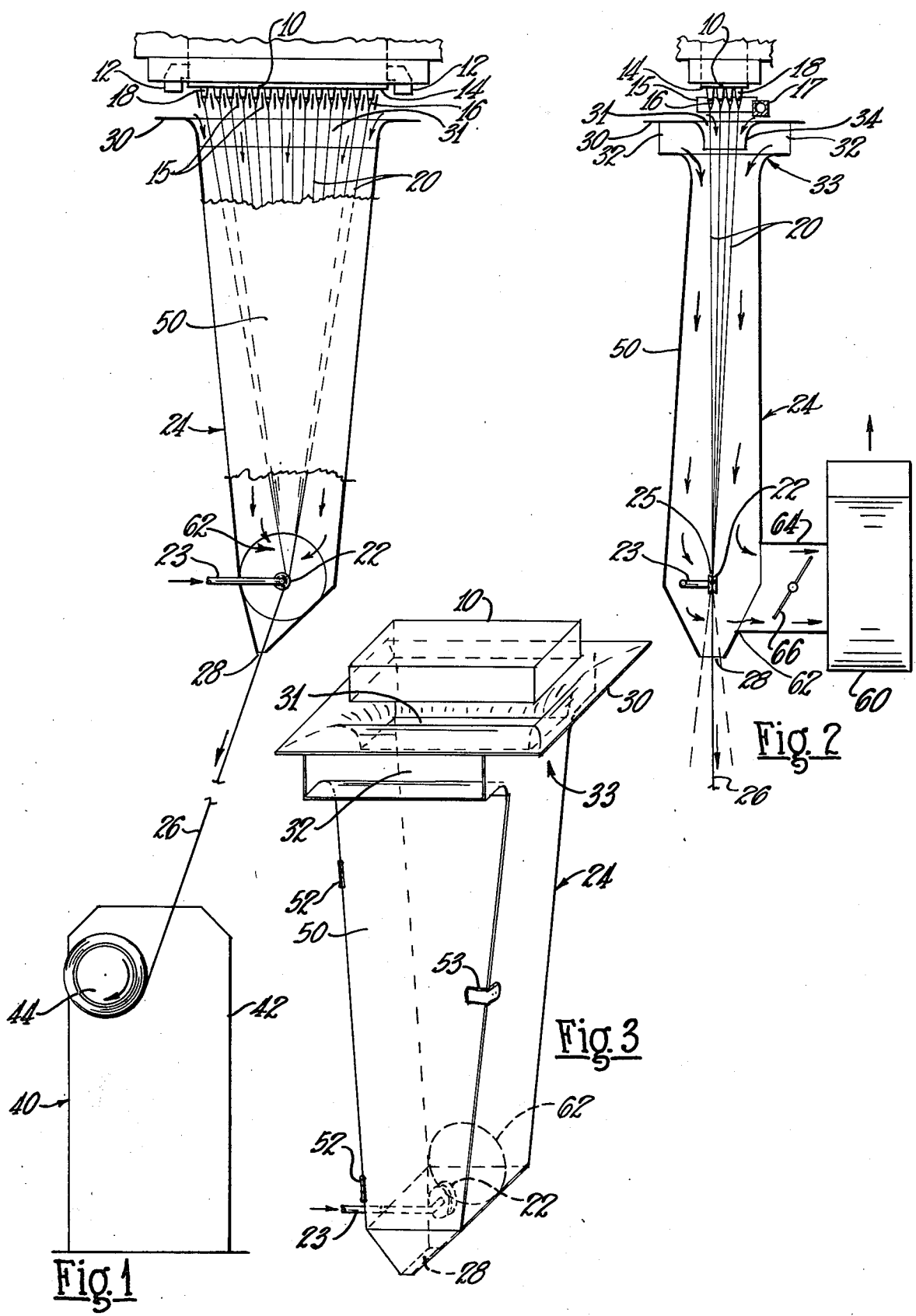

METHOD FOR TRANSPORTING GLASS FIBERS

This is a continuation, of application Ser. No. 477,722, filed June 10, 1974, which in turn is a continuation of application Ser. No. 316,141, filed Dec. 18, 1972, which are both now abandoned.

BACKGROUND OF THE INVENTION

This invention relates to production of continuous filaments of a thermoplastic material and more particularly to improvements for producing such filaments where production apparatus uses mechanical attenuation of filaments from streams of heated thermoplastic material. The invention is especially useful in producing continuous glass filaments and strands of these filaments.

Normally heated thermoplastic materials such as molten glass are drawn into continuous filaments from streams flowing from a feeder holding a body of the heated material. Usually apparatus attenuates the streams into individual continuous filaments and combines them into a bundle or strand under the influence of pulling forces exerted directly by a winder. The winder collects the strand into a wound package on a collection tube mounted on a driven rotatable collet. The winders commonly used can collect strands at linear strand speeds in the order of 10,000 to 15,000 feet per minute or more.

Like other processes the glass fiber forming process is preferably kept running under controlled conditions on a substantially continuous basis with a minimum of operator attention. Accordingly, filament breaks, a major cause of process interruptions, must be kept at a minimum to effect quality of output and economy of production.

Numerous attempts have been made in the prior art at reducing the number of filament breaks to assure a more continuous process. For example U.S. Pat. No. 2,908,036 introduced fin shields which effected control and optimization of viscosity and temperature of the glass exiting from the feeder orifices. Also winders have been modified for more constant and uniform attenuation forces. Even sizing applicators have been improved to reduce the tension imparted when liquid coatings are applied to the filaments.

As the linear speed of the newly formed filament increases, the air drag on the filament also increases. And the pulling forces exerted by the winder must correspondingly be increased. Tests have shown that at the higher forming speeds, the air drag may account for 40% of more of the total tension forces in the filaments. The air drag may form an important variable causing filament breaks and higher winder pulling power.

The prior art patents such as U.S. Pat. Nos. 3,150,946 and 3,697,241 have introduced means for supplying cooling air to the glass streams and filaments. But prior art apparatus is notably deficient in supplying of high speed complementary air flow to reduce tension forces in the fiber forming process.

SUMMARY OF THE INVENTION

An object of the invention is to provide an improved method and apparatus reducing the stresses in the high speed forming of continuous filaments from flowable thermoplastic filament forming material such as molten glass;

Another object of the invention is improved method of and apparatus for forming continuous filaments at high speeds from heated thermoplastic filament forming material, such as molten glass wherein the air drag on the filaments is minimized and the number of filament breaks per unit time caused by the air drag is reduced.

Another object of the invention is improved method of and apparatus for matching the direction and speed of the air surrounding the filaments with the feed speed of the filaments to reduce the air drag on the filaments during the collection of a wound strand package.

Still another object of the invention is improved method of and apparatus for processing linear elements transported at high speeds.

Yet another object of the invention is a reduction in the pulling force required to advance linear material at high speeds.

One feature of the invention is greater continuity of glass fiber producing operations because the reduction in air drag on the filaments also promotes a reduction in the number of filament breaks per unit time.

Another feature of the invention is a wound package of linear material which is easier to unwind because it is wound under lower tensions, also the lower tension reduces the crushing of the inner layers of the wound material.

Still another feature of the invention is the ability to produce glass filaments of smaller diameter because less pulling force is required to attenuate and wind the filaments on a rotating package.

Yet another feature of the invention is that a controlled environment can be introduced to surround the filaments and chemicals may be included in the environment that will not be exhausted.

The above and other objects are attained by apparatus for and method of processing linear material that includes air channeling means surrounding the linear material and disposed between the supply means of the material and the rotary collection means for the material. The air channeling means produces air flow in the direction of travel of the linear material to reduce the differences in velocity between the linear material and the air.

The apparatus includes means for producing or inducing air flow in the direction of travel of the linear material to bring the rate of air flow into conformity with the linear feed rate of the material. This matching of air and material velocity reduces the velocity gradient between the linear material and the air thereby minimizing air drag or tension on the linear material. As disclosed herein the invention is exemplified in relation to glass fiber forming operation but it will be readily grasped by those familiar with the art that the invention has application in other fiber processes where stresses of fibers being moved at high linear speeds present difficulties.

Other objects and advantages will become apparent as the invention is described more clearly in detail with references made to the accompanying drawings.

DESCRIPTION OF THE DRAWINGS

FIG. 1 is a front elevational view, partially in section, of fiber processing apparatus exemplifying the principles of the present invention wherein the filaments are attenuated and collected at high speeds in a wound package with moving air embracing the filaments in their path of movement to the collector.

FIG. 2 is a side elevational view, partially in section, of the apparatus shown in FIG. 1.

FIG. 3 is an isometric view of the apparatus shown in FIG. 1.

DESCRIPTION OF THE PREFERRED EMBODIMENTS

Figure 4:
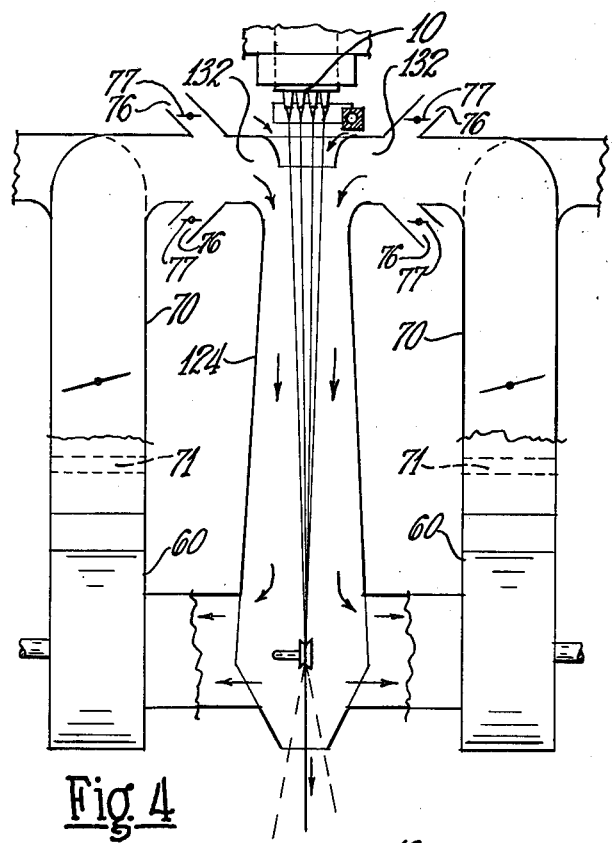
FIG. 4 is a front elevational view, partially in section of another embodiment of the invention wherein the moving air is recirculated.

The method and apparatus of the invention are particularly valuable in processing or forming filaments from heat softened fiber forming material such as molten glass where high filament processing speeds affect filament production. Yet, method and apparatus embodying the principles of the invention are also useful in processing and transporting textile filaments made from other thermoplastic filament forming materials. Thus the disclosed glass filament forming operation is only an example used to explain the operation of the invention. The invention has wider application in a variety of filament forming operations and processing operations for linear material generally.

FIGS. 1 and 2 show continuous glass filament forming apparatus embodying the principles of the invention; the apparatus is shown in operation during package build. The embodiment uses a rotary filament pulling and winding device to form and collect continuous glass filaments at a constant filament forming speed. The air control means or duct is below a source of molten streams from which the glass filaments are drawn and above the filament gathering device and collecting winder. The air control means surrounds the filaments shielding them from extraneous air currents and producing complementary air flow in the direction of filament movement. Hence, the resistance to flow normally caused by the air is minimized. The results are reduced stresses in the filaments and a reduction in the amount of energy required by the winding device to pull the filaments.

FIGS. 1 and 2 illustrate a container or feeder 10 that holds a body of molten glass. The feeder 10 can receive a continuing supply of molten glass by several known ways. For example, a forehearth can supply molten glass to the feeder 10 from a furnace heating batch materials to molten glass. Also, a melter associated with the feeder 10 can supply molten glass to the feeder by reducing glass marbles to a heatsoftened condition. At the ends of the feeder are terminals 12 that connect to a source of electrical energy to heat the feeder 10 by conventional resistance heating. Such heating keeps the molten glass in the feeder 10 at proper fiber-forming temperatures and viscosities. The feeder 10 has a bottom 14 with orifices or passageways for delivering streams 16 of molten glass from the feeder 10. As shown depending orifices projections or tubular members 18 define the openings in the bottom 14.

The feeder 10 is normally made of platinum or an alloy of platinum. Located adjacent the orificed projections 18 are metal fins 15 which are connected in heat conducting relationship to a water cooled manifold 17. The fins divide the total number of projections 18 into smaller groups and are effective in cooling the hot molten streams 16 and filaments 20.

The molten glass streams 16 are attenuated downwardly into individual continuous glass filaments 20. Immediately after the glass filaments are formed they enter the air control channel or duct 24 below the feeder 10. The exhaust fan 60 exhausts air through exit passage 62 thus inducing air flow into the duct 24 through its upper opening 32. The fan 60 is regulated to induce an air flow speed matched to the linear speed of the filaments. In this way the air drag on the individual filaments is minimized.

A sizing applicator and gathering shoe 22 supported within the duct 24 applies a liquid sizing or other protective coating material to the swiftly traveling continuous glass filaments and combines the filaments into a bundle or strand 26. The applicator may be any suitable type of applicator known to art. However, the applicator preferably presents a minimum of interference with air flow through the duct 24. As shown in FIGS. 1 and 2 the applicator gathering shoe 22 is hollow and connected to a supply of liquid coating material by means of a tube 23.

From the applicator 22, the combined filaments or strand 26 proceeds to a winder 40 which applies the necessary tension force for attenuating the molten glass streams 16 supplied by the feeder 10 into glass filaments. The collet 44 is rotatably mounted on a housing 42 located below the gathering shoe 22. A motor (not shown) within the housing 42 rotates the pulling wheel at a constant high angular speed sufficiently fast to withdraw the continuous glass filaments 20 from the streams 16 at linear speeds to 12,000 feet per minute and faster.

The upper inlet into the air velocity control duct 24 is designed to provide minimum disturbance to the fiber forming region. As shown in FIGS. 2 and 3, the upper portion of the air control apparatus comprises a top horizontal isolating barrier 30 with an opening 31 through which the filaments 20 enter the air control duct 24. The major air inlets 32 are at the front and back sides of the feeder 10 beneath the isolating barrier 30. The side inlets 32 are several times larger than the opening between the feeder 10 and the top opening 31 through which the filaments pass. This difference in size assures that most of the air introduced into the duct 24 comes from the side inlets 32. As the air enters the side inlets, it impinges on two curved air deflectors 34 which protect the filaments from horizontal air forces by directing the induced air in a downwardly direction parallel to the filaments.

The duct or primary air channel 24 has a constant cross-sectional area from the level of the inlet 32 to the general level of the high velocity exhaust fan 60. This helps assure that the air velocity along the length of the ducts remains constant. In the embodiment shown in FIGS. 1, 2 and 3 for use with a very fine fiber system producing fibers 0.00015 inches in diameter, the inlet end 33 of the duct 24 is about 8 inches by 2 inches. Near the bottom end of the duct 24 adjacent the fan exhaust outlet 62, the duct is about 4 inches square. Thus the total cross-sectional area of the duct is about 16 square inches all along its length.

To make the use of the duct 24 as convenient as possible, the front panel 50 is hinged at one side to provide access into the duct during the start up of the fiber forming operation for cleaning purposes. The hinges 52 and latches 54 are preferably attached only to the out-side of the duct 24. If any of their parts extended into the duct, they could cause undesirable air turbulence in the duct.

A high velocity fan 60 is attached by means of a connecting air duct or channel 64 to the main duct 24. The point of attachment 62 of the connecting channel 64 to the main duct 24 is near the level where the filaments are gathered into a strand 26. Once the filaments have been combined into one strand, the air drag on the filaments is less critical because the exposed surface area is less and the combined strength of the strand is greater than that of the individual filaments. The cross-sectional area of the opening of the connecting channel 64 is at least as large as that of the main duct 24. This helps assure an even flow of air through and out of the main duct.

Below the connecting channel's point of attachment 62 to the main duct, the main duct is tapered to a restricted outlet 28. By restricting the outlet to as small an opening as possible, the majority of the air passing through the main duct 24 enters through the larger side openings 32 at the top of the duct.

The gathering shoe 22 shown in this embodiment also functions as the binder applicator. Both functions are combined to present a minimum of interference with the air flow. The gathering shoe-applicator 22 is hollow and is supported by a hollow tube 23 which also supplies the binder under pressure to the hollow applicator.

The binder flows from the tube 23 into the circumferential groove 25 of the applicator 32 through small opening formed in the axis of the applicator. As the strand passes across the groove, binder is applied to it.

The binder may be applied to the filaments or strand in ways other than the embodiment shown. For example a conventional belt applicator or the spraying of a fine mist of binder into the duct 24 may be satisfactory. Whatever method of binder application is employed, it should be designed to complement the air flow through the duct.

The pulling or attenuating force on filaments may be applied by any mechanical means. A standard winder is illustrated in FIGS. 1 and 2. However, any pull wheel, such as the ones shown in U.S. Pat. Nos. 3,071,301 and 3,279,904, may be used to help form wound packages or to deposit the filaments on a conveyor forming a mat product.

The operation of a filament forming operation employing this invention is very straight forward. With the access panel 50 open the fiber forming operation is started in a conventional manner. The initial filaments 20 are formed and wrapped around the collet 44 to begin the operation. The access panel is closed and as the winder 40 comes up to speed, the exhaust fan 60 is also started. Conventional sensing and control means are employed for sensing the relative speed of the filaments and the air which surrounds the filaments in the duct 24. In response to the control signals the damper 66 in the connecting channel 64 is positioned to assure that the air speed is matched to the speed of the filaments 20.

The duct may be formed into other aerodynamic shapes which will also perform the stress reduction function of this invention. For example, a more circular, nozzle-type shape may be advantageous because less air turbulence may be created therein. The shape illustrated in the present application is one which will perform satisfactorily, yet it is relatively easy to fabricate because of its straight flat sides. Also the straight sides make it easier to hinge the front access panel 50. The duct 24 illustrated also has a substantially uniform cross-section in the areas where it surrounds the separate filaments. The purpose of the uniform cross section is to help assure a uniform constant air flow. However, for some applications it may be desirable to converge or diverge the sides of the duct in order to vary the velocity and flow of air.

In any case, it is desirable to shape the duct so that it offers a relatively low resistance to flow of air moving linearly therethrough with the fibers. For some applications it may be possible to shape the duct so that no extra air inducing means such as exhaust fans or blowers are required. By using the specially shaped duct to establish a particular air flow around the filaments, the tension imparted to the filaments in comparison to that imparted without the shaped duct may be lowered.

In other applications, the isolating barrier 30 and air deflectors 34 shown in FIGS. 1 and 2 may be sufficient by themselves to provide the necessary shielding of the filaments and to promote complementary air flow in the direction of the filaments to reduce the tension in the filaments caused by air drop.

FIG. 4 illustrates an embodiment wherein the air pulled through the duct 24 is recirculated. The side inlets 132 are modified slightly to provide connection points for the return air ducts 70. The return ducts are provided with filters 71, if needed, as well as exhaust branches 72 and dampers 73 to aid in controlling the return air flow. In this embodiment the majority of the inlet air is air which is being recirculated. However, auxiliary inlets 76 with dampers 77 are also provided to allow for the introduction of additional air. The embodiment shown in FIG. 4 is especially conducive to the use of gases other than air. Since the air is recirculated, other gases which help promote more satisfactory fiber forming may now be used more economically. For example, it has been found that for some fiber forming processes a carbonaceous environment is desirable. In such instances the system may be closed to external sources of air and a propane and carbon dioxide mixture could be supplied to the closed system. Likewise, a gaseous environment may be used to chemically treat the surface of the filaments to protect the filaments or prepare them for later treatments or uses.

Figure 5:
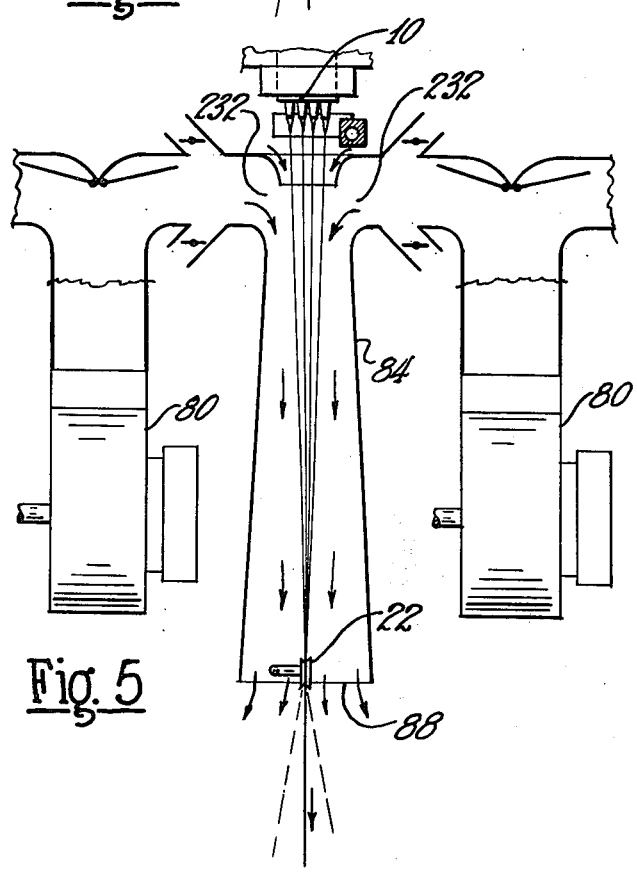
FIG. 5 is a front elevational view partially in section of another embodiment of the invention wherein a portion of the air is injected into the system.
Figure 6:
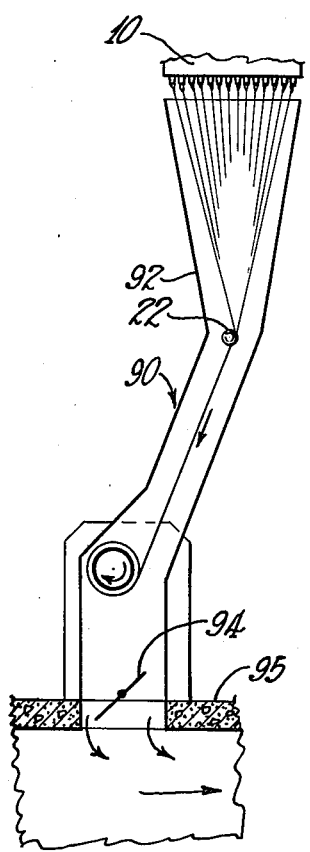
FIG. 6 is a front elevational view partially in section of still another embodiment of the invention wherein the moving air path extends over a greater portion of the overall fiber processing apparatus.

In the embodiment shown in FIG. 5, the air flow is promoted by blowers 80 attached to the side inlets 232. The duct 84 is similar to that shown in FIG. 5 except that the opening 88 beneath the gathering shoe applicator 22 is not restricted thus allowing for free flow of air through the duct.

In each of the aforementioned embodiments, some sensing and control circuit is desirable. Both speed of the filaments and the air should be sensed so that appropriate control of air flow or strand speed can be made to assure the optimum forming environment. Examples of controllable variables include air dampers, fan speed, glass temperature and winder or pull wheel speed.

In embodiments wherein air is introduced at high velocity into the upstream region of the duct 24. Both the contour of the top surface and the bottom surface of the air deflectors 34 is important to promote smooth flow of air into the through the air channel or duct 24. For example, the air which enters from between the feeder 10 and the isolating barrier 30 should enter at an angle that will not adversely disturb the glass streams or filaments. Likewise, the bottom surface of the deflectors 34 may be contoured to control flow through the inlet into the duct 24. Also, the top surface of the upper edge of the duct 24 at the opening 32 may be shaped to promote smooth flow of air into the air duct 24.

FIG. 7 illustrates another embodiment wherein the duct is extended past the gathering shoe 22 to encompass all the fiber forming equipment including the winder. The upper portion 92 of the duct 90 is similar to the duct 24 shown in FIGS. 1 and 2. However the exhaust fan is moved to a position beneath the floor 95. Also, the duct 90 does not taper to a restricted outlet. Rather the sides of the duct extend from the gathering shoe 22 to the floor 95. The duct now surrounds the winder and additional hinged access panels (not shown) are provided. The high velocity exhaust fan (not shown) is now in position beneath the floor 95. A sensing circuit (not shown) is used to measure the air flow and control the air flow in the duct by moving the damper 94.

As will be apparent to those skilled in the art, other embodiments using the present invention are possible. For example, the air inlets and outlets of the air channel or duct may be varied along the length of the duct to achieve the desired balance of air flow through the channel. In addition, the shape of the air duct is another variable that may be varied to control air flow through the duct. Likewise the design of the isolating barrier and the air baffles attached thereto may be modified to assure the high velocity air moved into the air duct does not disturb the attenuation of the glass streams into filaments. Also, the filament opening in the isolating barrier may be changed in shape or divided into several separate openings. Still other variations may be made in the method and apparatus for moving air through the duct. It is apparent that other forms and variations may be made within the general concept of this invention and it is my intent to claim any and all such variations.

I claim:

1. A method for reduction of tension in continuous filaments formed from heat-softened filament forming material wherein the tension in the filaments is due to movement of such filaments at a high linear speed through air comprising:

mechanically attenuating streams of the heat-softened filament forming material into fine filaments;

linearly advancing the filaments through a passageway at a known rate of speed; and, moving air in the passageway in the same direction and at substantially the same speed as the advancing filaments to reduce tension in the advancing filaments from the effects of air drag, the air and filaments being moved at substantially the same speed through a major portion of the passageway.

2. The method of claim 1 in which the relative speed of the filaments and the air in the passageway are sensed and the speed of the air is controlled responsive to said sensing so that the air is moving at substantially the speed of the filaments.

3. The method of claim 1 in which the filaments are advanced by winding the filaments onto a collection device.

4. The method of claim 1 in which a portion of the air is exhausted from the passageway at a downstream region of the passageway.

5. The method of claim 4 in which the exhausted air is reintroduced into the upper regions of the passageway.

6. The method of claim 1 in which the filaments are gathered together to form a strand within the passageway.

7. The method of claim 6 in which the air is exhausted from the passageway in the general region where the filaments are gathered into a strand.

8. A method for reducing the tension due to air drag in continuous fibers moved at a high linear speed, comprising:

mechanically advancing the fibers at a known speed through a duct having a constant cross sectional area;

moving air in the duct in the same direction as the advancing fibers; and, controlling the speed of the air so that the air is moved at substantially the same speed as the advancing fibers to reduce tension in the advancing fibers from the effects of air drag, the air and the fibers being moved at substantially the same speed through a major portion of the duct.

9. The method of claim 8 in which the fibers are collected on a package after they have been advanced through the duct.

* * * * *